United States Patent
Jeon et al.

(10) Patent No.: US 9,128,229 B2
(45) Date of Patent: Sep. 8, 2015

(54) BACKLIGHT DEVICE AND LIQUID DISPLAY DEVICE INCLUDING THE SAME

(71) Applicant: Samsung Display Co., Ltd., Yongin, Gyeonggi-do (KR)

(72) Inventors: Jae-Hwan Jeon, Seoul (KR); Yong Woo Kim, Seoul (KR); Chang Young Bang, Suwon-si (KR); In-Su Baek, Seoul (KR); Ju-Hyun Shin, Hwaseong-si (KR); Sang A An, Daejeon (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 291 days.

(21) Appl. No.: 13/728,557

(22) Filed: Dec. 27, 2012

(65) Prior Publication Data
US 2014/0043563 A1 Feb. 13, 2014

(30) Foreign Application Priority Data
Aug. 7, 2012 (KR) .................. 10-2012-0086333

(51) Int. Cl.
*G02F 1/1335* (2006.01)
*F21V 8/00* (2006.01)

(52) U.S. Cl.
CPC ............ *G02B 6/0068* (2013.01); *G02B 6/0021* (2013.01); *G02F 1/133603* (2013.01); *G02F 1/133608* (2013.01); *G02F 1/133615* (2013.01); *G02B 6/0073* (2013.01)

(58) Field of Classification Search
USPC ........................... 349/61, 65; 362/608
See application file for complete search history.

(56) References Cited

U.S. PATENT DOCUMENTS

| 7,139,048 B2 | 11/2006 | Han et al. |
| 7,507,011 B2 | 3/2009 | Ueno et al. |
| 2009/0316074 A1* | 12/2009 | Tomiyoshi ............ 349/65 |
| 2011/0305038 A1* | 12/2011 | Kokusho ............ 362/611 |

FOREIGN PATENT DOCUMENTS

| JP | 08-146415 | 6/1996 |
| JP | 08-320489 | 12/1996 |
| JP | 2004-012747 | 1/2004 |
| JP | 2004-087408 | 3/2004 |
| JP | 4260358 | 2/2009 |
| KR | 100783501 | 12/2007 |
| KR | 1020080022723 | 3/2008 |
| KR | 10-1005261 | 12/2010 |
| KR | 20-0453419 Y | 4/2011 |
| KR | 1020110101909 | 9/2011 |

* cited by examiner

*Primary Examiner* — Lucy Chien
(74) *Attorney, Agent, or Firm* — F. Chau & Associates, LLC

(57) ABSTRACT

A backlight device includes a light guide plate including a plurality of edges and a light source bar. At least one of the plurality of edges includes a depression, the light source bar is positioned within the depression and includes a plurality of light sources, and the plurality of light sources emit light in different directions.

22 Claims, 7 Drawing Sheets

BACKLIGHT DEVICE AND LIQUID DISPLAY DEVICE INCLUDING THE SAME

CROSS-REFERENCE TO RELATED APPLICATION

This application claims priority under 35 U.S.C. §119 to Korean Patent Application No. 10-2012-0086333, filed on Aug. 7, 2012, the disclosure of which is incorporated by reference herein in its entirety.

TECHNICAL FIELD

Exemplary embodiments of the present invention relate to a backlight device and a liquid crystal display including the same.

DISCUSSION OF THE RELATED ART

A display device may be a self-emissive display device that displays an image by emitting light itself, or a passive display device that displays an image by controlling the light emitted from a separate light source (e.g., a liquid crystal display).

A liquid crystal display includes two display panels on which field generating electrodes such as pixel electrodes and a common electrode are formed, a liquid crystal layer interposed between the display panels, and a backlight that provides the light to the display. Voltages are applied to the field generating electrodes so as to generate an electric field over the liquid crystal layer, and the alignment of liquid crystal molecules of the liquid crystal layer is determined by the electric field. The amount of light provided from the backlight is controlled to display an image. The backlight may include a light source that emits the light, a light guide plate that diffuses the light from the light source to convert it into a planar light source, and various compensation films and diffusion films.

The light source may be, for example, a cold cathode fluorescent lamp (CCFL), an external electrode fluorescent lamp (EEFL), or a light emitting diode (LED).

The number and arrangement of light sources within the backlight may affect the manufacturing cost and luminance of the display device.

SUMMARY

Exemplary embodiments of the present invention provide a backlight device having improved luminance, and a liquid crystal display including the same.

A backlight device according to an exemplary embodiment of the present invention includes a light guide plate having a polygonal horizontal cross-section including a plurality of edges, and a light source bar positioned at at least one edge of the horizontal cross-section of the light guide plate and including a plurality of light sources. At least one edge of the horizontal cross-section of the light guide plate includes at least one depression, the light source bar is positioned inside the depression, and the light source bar includes light sources having different light emitting directions.

The light source bar may include a main bar and a sub-bar connected to the main bar while forming a first angle, and at least one light source may be positioned at the main bar and the sub-bar.

The first angle may be about 45 degrees.

A bottom chassis enclosing the light guide plate and the light source bar may be further included. The bottom chassis may include a protrusion protruded toward the depression of the light guide plate, and the light source bar may be positioned between the protrusion and the light guide plate.

The edge of the horizontal cross-section of the light guide plate may include a first edge and a second edge meeting the first edge. A length of the first edge may be longer than a length of the second edge, and the depression may be formed at the first edge.

The depression may be positioned substantially at the center of the first edge.

The edge of the horizontal cross-section of the light guide plate may include a first edge and a second edge meeting the first edge. A length of the first edge may be longer than a length of the second edge, and the depression may be formed at the second edge.

The depression may be positioned substantially at the center of the second edge.

Multiple light source bars may be positioned at the edge of the horizontal cross-section of the light guide plate.

The depression may have a trapezoid shape.

The light source may have an emission angle of more than about 60 degrees to less than about 80 degrees.

A liquid crystal display according to an exemplary embodiment of the present invention includes a liquid crystal panel and a backlight device configured to provide light to the liquid crystal panel. The backlight device includes a light guide plate having a polygonal horizontal cross-section including a plurality of edges, and a light source bar positioned at at least one edge of the horizontal cross-section of the light guide plate and including a plurality of light sources. At least one edge of the horizontal cross-section of the light guide plate includes at least one depression, and the light source bar is positioned inside the depression.

The light source bar may include a first bar and a second bar connected to the first bar while forming a first angle, and at least one light source may be positioned at the first bar and the second bar.

The first angle may be about 45 degrees.

A bottom chassis enclosing the light guide plate and the light source bar may be further included. The bottom chassis may include a protrusion protruded toward the depression of the light guide plate, and the light source bar may be positioned between the protrusion and the light guide plate.

The edge of the horizontal cross-section of the light guide plate may include a first edge and a second edge meeting the first edge. A length of the first edge may be longer than a length of the second edge, and the depression may be formed at at least one of the first edge and the second edge.

The depression may be positioned at substantially the center of at least one of the first edge and the second edge.

Multiple light source bars may be positioned at the edge of the horizontal cross-section of the light guide plate.

The depression may have a trapezoid shape.

The light source may have an emission angle of more than about 60 degrees to less than about 80 degrees.

A backlight device according to an exemplary embodiment of the present invention includes a light guide plate including a plurality of edges, wherein at least one of the edges comprises a depression, and a light source bar positioned within the depression and including a plurality of light sources configured to emit light in different directions.

A liquid crystal display according to an exemplary embodiment of the present invention includes a liquid crystal panel, and a backlight device configured to provide light to the liquid crystal panel, wherein the backlight device includes a light guide plate including a plurality of edges, wherein at least one of the edges comprises a depression, and a light source bar positioned within the depression and including a plurality of light sources configured to emit light in different directions.

A backlight device according to an exemplary embodiment of the present invention includes a light guide plate including a depression disposed substantially at a center of one of a plurality of edges, a light source bar disposed within the depression and including a main bar and a sub-bar forming a bent shape, a first light source disposed on the main bar and configured to emit light in a first direction, and a second light source disposed on the sub-bar and configured to emit light in a second direction different from the first direction.

According to an exemplary embodiment of the present invention, luminance may be improved by reducing an emission angle of the light source.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
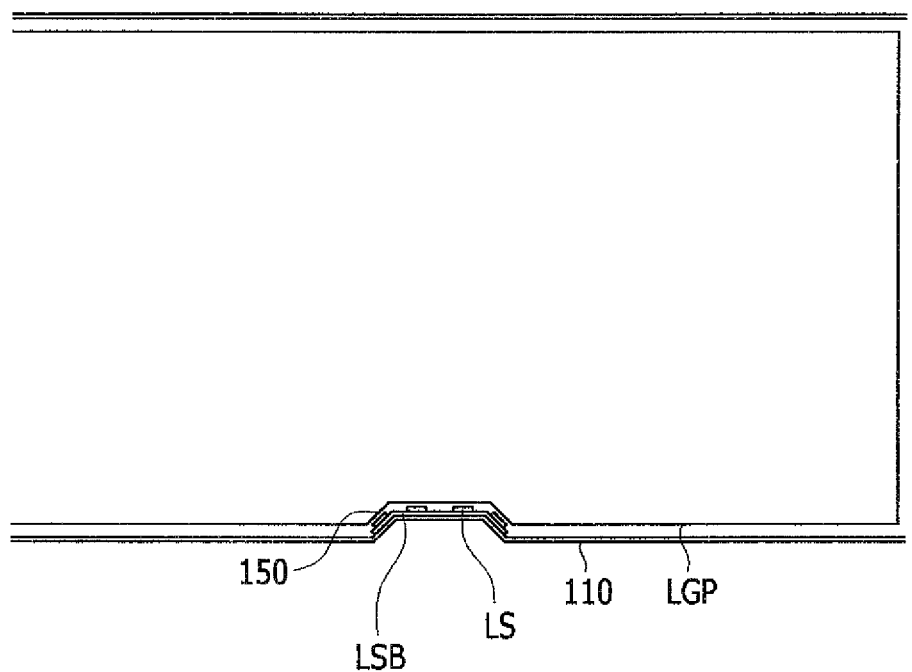
FIG. 1 is a top plan view of a backlight device according to an exemplary embodiment of the present invention.

Exemplary embodiments of the present invention will be described more fully hereinafter with reference to the accompanying drawings Like reference numerals may refer to like elements throughout the accompanying drawings.

Figure 2:
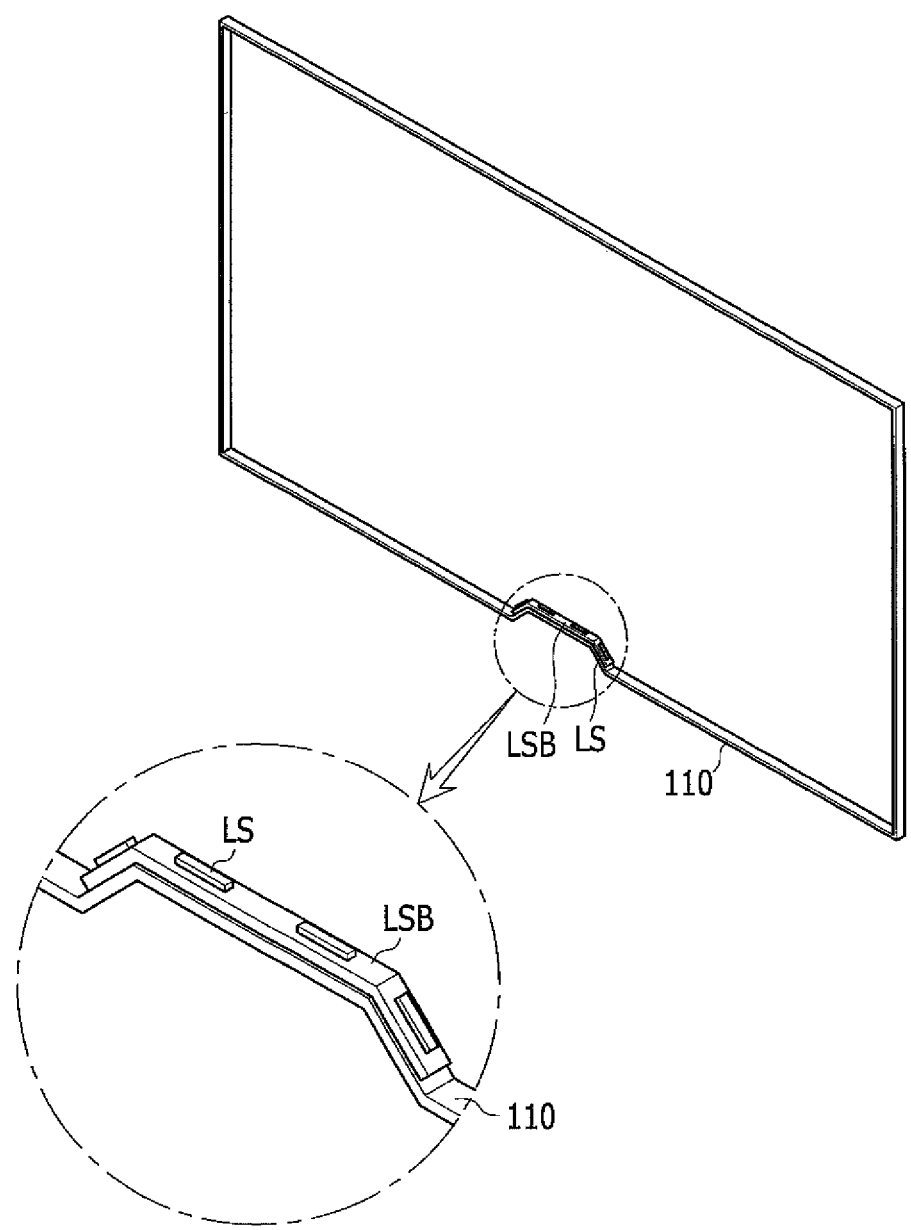
FIG. 2 is a perspective view of a backlight device according to an exemplary embodiment of the present invention.

FIG. 1 is a top plan view of a backlight device according to an exemplary embodiment of the present invention. FIG. 2 is a perspective view of a backlight device according to an exemplary embodiment of the present invention.

Referring to FIGS. 1 and 2, a backlight device according to an exemplary embodiment of the present invention includes a light guide plate LGP having a horizontal cross-section including a plurality of edges, and a light source bar LSB formed substantially adjacent to at least one of the edges. As shown in FIGS. 1 and 2, in an exemplary embodiment, the light guide plate LGP may be substantially in the shape of a quadrangle, and may have first sides extending in a horizontal direction and second sides, shorter than the first sides, extending in a vertical direction. The first sides may be substantially parallel to each other, and the second sides may be transverse to the first sides, and may be substantially parallel to each other. A depression 150 may be formed at an edge of the light guide plate LGP. For example, as shown in FIGS. 1 and 2, the depression 150 may be formed at an edge of one of the first sides of the light guide plate LGP. In an exemplary embodiment, the light guide plate LGP may include a single depression 150 formed at a single edge. The depression 150 may be substantially in the shape of a trapezoid, and may be formed substantially in the center of the edge it is formed on. The light source bar LSB is positioned in the depression 150 of the light guide plate LGP, and the light source bar LSB includes a plurality of light sources LS. The plurality of light sources LS are formed in different areas of the depression 150, and may have different orientations. As a result, light is emitted from the plurality of light sources LS in different directions. The light source bar LSB may be, for example, a printed circuit board (PCB). The light sources LS are mounted to the light source bar LSB, and may receive power and/or an electrical signal through the light source bar LSB via an external source.

As shown in FIGS. 1 and 2, the light guide plate LGP may be positioned on the bottom chassis 110, and one edge of the bottom chassis 110 may have a depressed shape in accordance with the depression 150 of the light guide plate LOP. The light source bar LSB is positioned between the edge of the first side of the light guide plate LGP having the depression 150 and the depressed portion of the bottom chassis 110.

Figure 3:
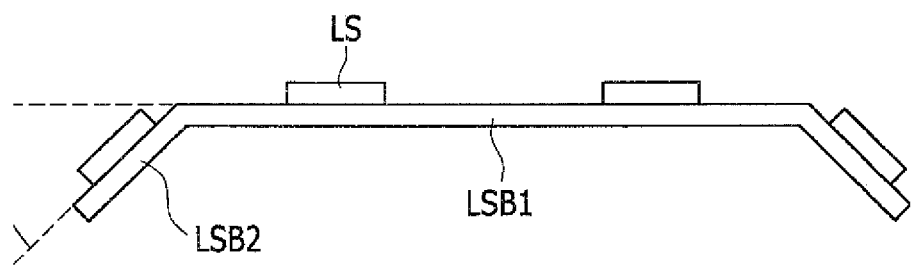
FIG. 3 is a cross-sectional view of a light source bar according to an exemplary embodiment of the present invention.

FIG. 3 is a cross-sectional view of a light source bar according to an exemplary embodiment of the present invention.

Referring to FIG. 3, in an exemplary embodiment, the light source bar LSB includes a main bar LSB1 and a sub-bar LSB2. The main bar LSB1 is connected to the sub-bar LSB2 and forms a first angle α. The light source bar LSB has a bent shape near a boundary where the main bar LSB1 and the sub-bar LSB2 meet. The first angle α may be about 45 degrees, however the first angle α is not limited thereto. For example, the first angle may be adjusted according to a size of a desired bezel.

Figure 4:
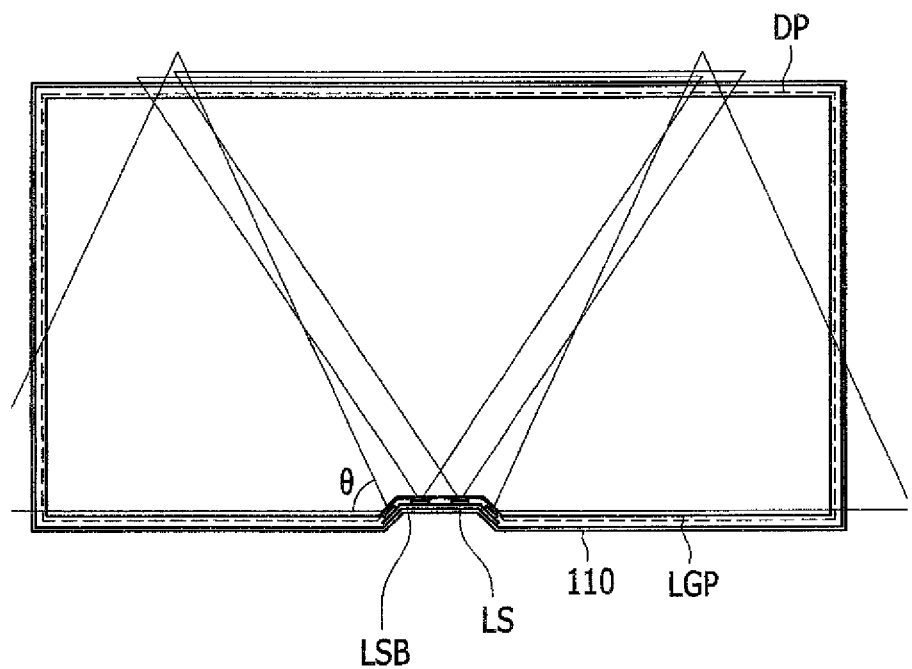
FIG. 4 is a top plan view illustrating light irradiation distribution in a backlight device according to an exemplary embodiment of the present invention.

FIG. 4 is a top plan view illustrating light irradiation distribution in a backlight device according to an exemplary embodiment of the present invention.

Referring to FIG. 4, the light sources LS emit light to a display area DP with an emission angle θ. To achieve uniformity, the light generated by the light sources LS is distributed such that most of the display area DP (e.g., substantially all of the display area DP) is covered.

When the emission angle θ of the light sources LS is large, the luminance may be decreased. As a result, a stronger current may be applied to the light sources LS to compensate for the decreased luminance, resulting in the increased generation of heat.

According to an exemplary embodiment, the bent shape of the light source bar LSB allows for improved light distribution covering most of the display area DP while also having a decreased emission angle θ. For example, in an exemplary embodiment, the emission angle θ may be about 60 degrees, however exemplary embodiments are not limited thereto. Thus, according to exemplary embodiments, the luminance may be increased while reducing the emission angle θ of the light source LS.

Figure 5:
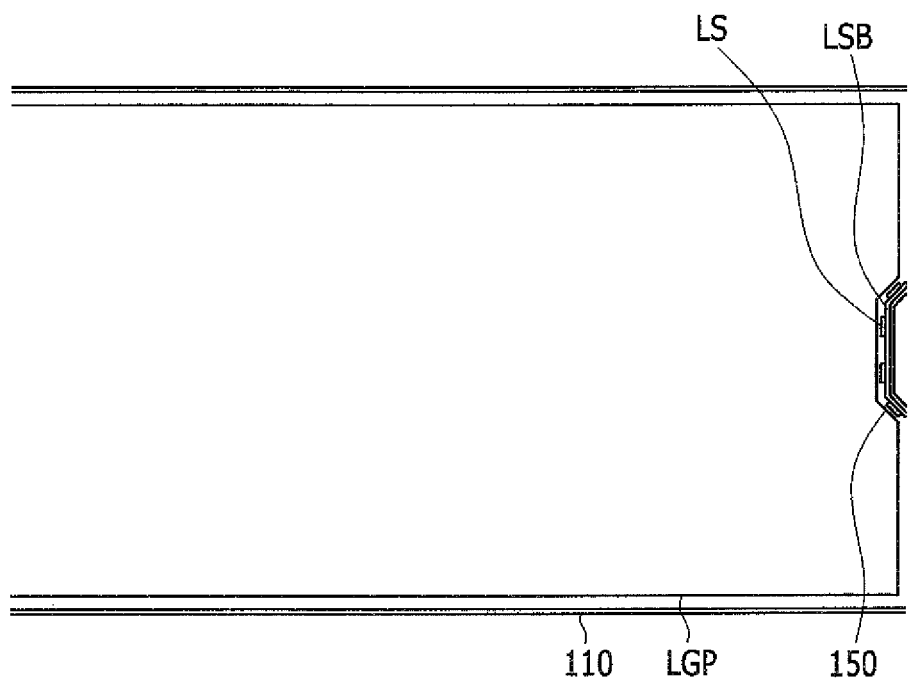
FIG. 5 is a top plan view of a backlight device according to an exemplary embodiment of the present invention.

FIG. 5 is a top plan view of a backlight device according to an exemplary embodiment of the present invention.

Referring to FIG. 5, a depression 150 is formed at an edge on one of the second sides of the light guide plate LGP (e.g., an edge on one of the shorter sides of the light guide plate LGP). Other than the location of the depression 150, the light guide plate LGP shown in FIG. 5 may be similar to the light guide plate LGP shown in FIG. 1.

According to exemplary embodiments of the present invention, forming a single light source bar including the light emitting diode LED near the center of one of the edges of the light guide plate, rather than at a corner portion of the light guide plate (e.g., where edges of the light guide plate meet), may result in improved luminance and an improved manufacturing process.

Figure 6:
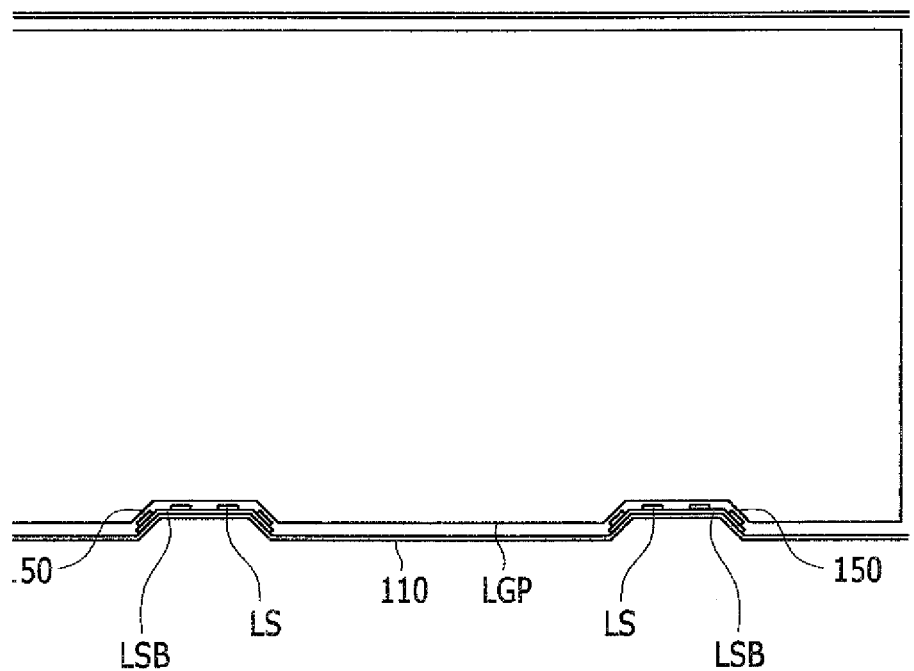
FIG. 6 is a top plan view of a backlight device according to an exemplary embodiment of the present invention.

FIG. 6 is a top plan view of a backlight device according to an exemplary embodiment of the present invention.

Referring to FIG. 6, a plurality of depressions 150 are formed at an edge on one of the first sides of the light guide plate LGP (e.g., an edge on one of the longer sides of the light guide plate LGP), and a plurality of light source bars LSB corresponding to the plurality of depressions 150 are formed. Other than the number and location of the depressions 150, the light guide plate LGP shown in FIG. 6 may be similar to the light guide plate LGP shown in FIG. 1. Utilization of multiple light source bars LSB formed in a plurality of depressions 150 of the light guide plate 150 may result in an increased luminance. Although the exemplary embodiment shown in FIG. 6 includes two depressions 150 and two corresponding light source bars LSB formed at an edge on one of the first sides of the light guide plate LGP (e.g., an edge on one of the longer sides of the light guide plate LGP), the present invention is not limited thereto. For example, in an exemplary embodiment, the light guide plate LGP may include more than two depressions 150 and light source bars LSB, and the depressions 150 and light source bars LSB may be formed at an edge on one of the second sides of the light guide plate LGP (e.g., an edge on one of the shorter sides of the light guide plate LGP).

Figure 7:
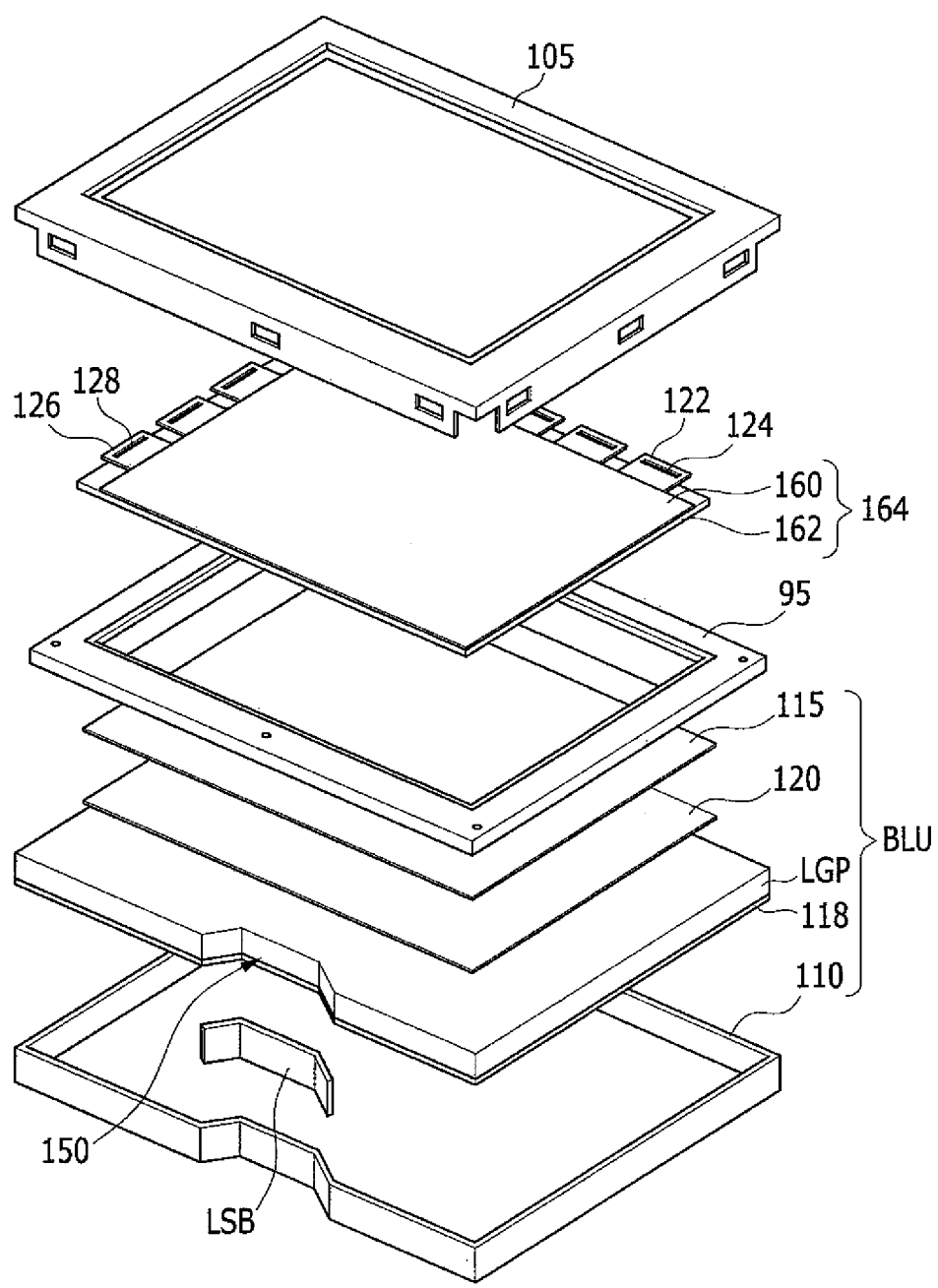
FIG. 7 is an exploded perspective view of a liquid crystal display including a backlight device according to an exemplary embodiment of the present invention.

FIG. 7 is an exploded perspective view of a liquid crystal display including a backlight device according to an exemplary embodiment of the present invention.

The liquid crystal display shown in FIG. 7 includes a liquid crystal panel 164 configured to display an image, a backlight device BLU configured to provide light to the liquid crystal panel 164, and a top chassis 105 and a bottom chassis 110 configured to receive the liquid crystal panel 164 and the backlight device BLU.

The top chassis 105 is bent to enclose a non-display area of the display panel 164 and a side surface of the bottom chassis 110. The top chassis 105 is coupled and fixed to a panel guide 95 that encloses the side surface of the bottom chassis 110.

The liquid crystal panel 164 is placed in the panel guide 95 and displays the image by controlling the light transmittance from the backlight device BLU according to the image signal. The liquid crystal panel 164 includes a liquid crystal layer formed between a lower substrate 162 and an upper substrate 160, and a spacer configured to maintain a space between the lower substrate 162 and the upper substrate 160.

The upper substrate 160 may include a color filter, a black matrix, and a common electrode.

The lower substrate 162 may include a thin film transistor and a pixel electrode connected to the thin film transistor. In an exemplary embodiment, the common electrode and the color filter or the black matrix may be formed in the lower substrate 162, which may improve an aperture ratio of the liquid crystal panel 164.

A data pad region connected to data lines and a gate pad region connected to gate lines may be formed in the non-display area of the lower substrate 162. A plurality of data circuit films 122 mounted with a data IC 124 that supply the image signal to the data lines may be attached to the data pad region. A plurality of gate circuit films 126 mounted with a gate IC 128 that supply a gate scan signal to the gate lines may be attached to the gate pad region.

Alternatively, the data IC 124 and the gate IC 128 may be mounted on the lower substrate 162 as a chip on glass (COG) type, or the gate IC 128 may be formed together with the thin film transistor of the lower substrate 162.

The backlight device BLU includes a light source bar LSB including a plurality of light emitting diode (LED) packages emitting light at one side of the liquid crystal panel 164, a light guide plate LGP configured to change a light source of the light source bar LSB into a planar light source and supply light to the overlying liquid crystal panel 164, a diffuser sheet 120 positioned on the light guide plate LGP and configured to scatter the light emitted from the light guide plate LGP to radiate uniform light, a reflection sheet 118 positioned under the light guide plate LGP and configured to reflect leaked light in a side opposite to the display panel 164 to transmit the light to the light guide plate LGP, and a prism sheet 115 positioned on the diffuser sheet 120 and configured to collect the light diffused in the diffuser sheet 120. The light source bar LSB and the light guide plate LGP may be formed according to the exemplary embodiments of the present invention described herein.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A backlight device, comprising:
a light guide plate comprising a plurality of edges, wherein at least one of the edges comprises a single depression; and
a light source bar positioned within the single depression and comprising a plurality of light sources disposed within the single depression and configured to emit light in different directions.

2. A backlight device, comprising:
a light guide plate comprising a plurality of edges, wherein at least one of the edges comprises a depression; and
a light source bar positioned within the depression and comprising a plurality of light sources configured to emit light in different directions,
wherein the light source bar comprises a main bar and a sub-bar connected to the main bar forming a bent shape, at least one of the plurality of light sources is positioned at the main bar, and at least another one of the plurality of light sources is positioned at the sub-bar.

3. The backlight device of claim 2, wherein the sub-bar forms an angle of about 45 degrees with respect to the main bar.

4. A backlight device, comprising:
a light guide plate comprising a plurality of edges, wherein at least one of the edges comprises a depression;
a light source bar positioned within the depression and comprising a plurality of light sources configured to emit light in different directions; and
a bottom chassis enclosing the light guide plate and the light source bar,
wherein the bottom chassis comprises a protrusion protruding toward the depression of the light guide plate, and the light source bar is positioned between the protrusion and the light guide plate.

5. The backlight device of claim 1, wherein the plurality of edges of the light guide plate comprise a first edge and a second edge meeting the first edge, a length of the first edge is longer than a length of the second edge, and the depression is formed at the first edge.

6. The backlight device of claim 5, wherein the depression is positioned substantially at a center of the first edge.

7. The backlight device of claim 1, wherein the plurality of edges of the light guide plate comprise a first edge and a second edge meeting the first edge, a length of the first edge is longer than a length of the second edge, and the depression is formed at the second edge.

8. The backlight device of claim 7, wherein the depression is positioned substantially at a center of the second edge.

9. The backlight device of claim 1, wherein the depression has a trapezoid shape.

10. The backlight device of claim 1, wherein each of the plurality of light sources has an emission angle of at least about 60 degrees to at most about 80 degrees.

11. A liquid crystal display, comprising:
a liquid crystal panel; and
a backlight device configured to provide light to the liquid crystal panel, wherein the backlight device comprises a light guide plate comprising a plurality of edges, wherein at least one of the edges comprises a depression, and a light source bar positioned within the depression and comprising a plurality of light sources configured to emit light in different directions,
wherein the light source bar comprises a main bar and a sub-bar connected to the main bar forming a bent shape, at least one of the plurality of light sources is positioned at the main bar, and at least another one of the plurality of light sources is positioned at the sub-bar.

12. The liquid crystal display of claim 11, wherein the sub-bar forms an angle of about 45 degrees with respect to the main bar.

13. A liquid crystal display, comprising:
a liquid crystal panel;
a backlight device configured to provide light to the liquid crystal panel, wherein the backlight device comprises a light guide plate comprising a plurality of edges, wherein at least one of the edges comprises a depression, and a light source bar positioned within the depression and comprising a plurality of light sources configured to emit light in different directions; and
a bottom chassis enclosing the light guide plate and the light source bar,
wherein the bottom chassis comprises a protrusion protruding toward the depression of the light guide plate, and the light source bar is positioned between the protrusion and the light guide plate.

14. The liquid crystal display of claim 11, wherein the plurality of edges of the light guide plate comprise a first edge and a second edge meeting the first edge, a length of the first edge is longer than a length of the second edge, and the depression is formed at one of the first edge or the second edge.

15. The liquid crystal display of claim 14, wherein the depression is positioned substantially at a center of the first edge or the second edge.

16. The liquid crystal display of claim 11, wherein the light source bar is one of a plurality of light source bars, the depression is one of a plurality of depressions, the plurality of depressions are positioned at the at least one edge of the light guide plate, and the plurality of light source bars are respectively positioned within the plurality of depressions.

17. The liquid crystal display of claim 11, wherein the depression has a trapezoid shape.

18. The liquid crystal display of claim 11, wherein each of the plurality of light sources has an emission angle of at least about 60 degrees to at most about 80 degrees.

19. A backlight device, comprising:
a light guide plate comprising a depression disposed substantially at a center of one of a plurality of edges;
a light source bar disposed within the depression and comprising a main bar and a sub-bar forming a bent shape;
a first light source disposed on the main bar and configured to emit light in a first direction; and
a second light source disposed on the sub-bar and configured to emit light in a second direction different from the first direction.

20. The backlight device of claim 19, wherein the sub-bar forms an angle of about 45 degrees with respect to the main bar.

21. The backlight device of claim 19, wherein the plurality of edges comprise a first edge and a second edge meeting the first edge, a length of the first edge is longer than a length of the second edge, and the depression is formed at the first edge.

22. The backlight device of claim 19, wherein the plurality of edges comprise a first edge and a second edge meeting the first edge, a length of the first edge is longer than a length of the second edge, and the depression is formed at the second edge.

* * * * *